United States Patent
Ly et al.

(10) Patent No.: US 12,432,786 B2
(45) Date of Patent: Sep. 30, 2025

(54) UPLINK (UL) TRANSMISSION IN RANDOM ACCESS CHANNEL (RACH) ON FLEXIBLE CELL

(71) Applicant: QUALCOMM Incorporated, San Diego, CA (US)

(72) Inventors: Hung Dinh Ly, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/645,924

(22) Filed: Dec. 23, 2021

(65) Prior Publication Data

US 2023/0209613 A1    Jun. 29, 2023

(51) Int. Cl.
*H04W 74/0833*    (2024.01)
*H04W 72/02*     (2009.01)
*H04W 72/0453*   (2023.01)
*H04W 74/00*     (2009.01)
*H04W 74/08*     (2009.01)

(52) U.S. Cl.
CPC ....... *H04W 74/0841* (2013.01); *H04W 72/02* (2013.01); *H04W 72/0453* (2013.01); *H04W 74/006* (2013.01); *H04W 74/0866* (2013.01)

(58) Field of Classification Search
CPC ........... H04W 74/008; H04W 74/0841; H04W 74/006; H04W 74/0866; H04W 72/02; H04W 72/0453; H04W 72/40; H04W 74/0833; H04W 74/0836; H04W 74/002

See application file for complete search history.

(56) References Cited

U.S. PATENT DOCUMENTS 11,582,811 B2 *   2/2023   Xu ................... H04W 74/0833
2010/0254327 A1 * 10/2010  McBeath ............. H04L 1/1812
                                                      370/329

(Continued)

FOREIGN PATENT DOCUMENTS

WO    WO-2021231852 A2    11/2021

OTHER PUBLICATIONS

International Search Report and Written Opinion—PCT/US2022/079947—ISA/EPO—Feb. 21, 2023 (2106327WO).

*Primary Examiner* — Kan Yuen
(74) *Attorney, Agent, or Firm* — Qualcomm/Norton Rose Fulbright US LLP

(57) ABSTRACT

Systems, methods, and devices for wireless communication that support mechanisms for uplink carrier selection for uplink random access channel (RACH) transmissions in a flexible cell configuration in a wireless communication system. A user equipment (UE) in a flexible cell selects at least one carrier for transmitting one or more uplink RACH transmissions to a base station. In aspects, the base station transmits an indication to the UE indicating which carrier the UE is to select for transmitting the one or more uplink RACH transmission. In aspects, the UE determines the carrier to transmit the one or more uplink RACH transmissions to the base station based on a comparison of reference signal measurements to predetermined thresholds. In these aspects, based on whether the measurements exceed the predetermined thresholds or not, the UE selects a carrier for transmitting the one or more uplink RACH transmission to the base station.

24 Claims, 7 Drawing Sheets

(56) References Cited

U.S. PATENT DOCUMENTS

| | | | |
|---|---|---|---|
| 2010/0296467 A1* | 11/2010 | Pelletier | H04L 5/0048 370/329 |
| 2011/0274043 A1* | 11/2011 | Nam | H04L 5/0055 370/328 |
| 2012/0243497 A1* | 9/2012 | Chung | H04L 5/0055 370/329 |
| 2016/0143035 A1* | 5/2016 | Xue | H04L 5/001 370/329 |
| 2018/0376510 A1* | 12/2018 | Sun | H04W 72/23 |
| 2019/0215749 A1* | 7/2019 | Shih | H04W 74/085 |
| 2019/0223212 A1* | 7/2019 | Xiao | H04W 74/02 |
| 2019/0268949 A1 | 8/2019 | Menon et al. | |
| 2019/0349889 A1* | 11/2019 | Lu | H04W 74/0833 |
| 2020/0213042 A1* | 7/2020 | Zhu | H04W 76/27 |
| 2020/0275494 A1* | 8/2020 | Ingale | H04L 5/0091 |
| 2020/0281023 A1* | 9/2020 | Yan | H04W 72/0453 |
| 2020/0359422 A1* | 11/2020 | Xie | H04W 74/0833 |
| 2021/0014899 A1* | 1/2021 | Shih | H04W 74/0833 |
| 2021/0099906 A1 | 4/2021 | Nam et al. | |
| 2021/0194556 A1* | 6/2021 | Ly | H04L 5/0094 |
| 2021/0251016 A1* | 8/2021 | Xiong | H04L 1/0072 |
| 2021/0274550 A1* | 9/2021 | Zhang | H04W 80/02 |
| 2021/0307072 A1* | 9/2021 | Kusashima | H04W 74/0808 |
| 2021/0352712 A1* | 11/2021 | Ly | H04W 76/11 |
| 2022/0210739 A1* | 6/2022 | Yi | H04L 5/0042 |
| 2022/0417959 A1* | 12/2022 | Zhao | H04W 72/23 |
| 2023/0006797 A1* | 1/2023 | Hu | H04W 72/23 |
| 2023/0164757 A1* | 5/2023 | Zhang | H04W 72/54 370/329 |
| 2023/0164802 A1* | 5/2023 | Hu | H04W 74/004 370/329 |
| 2023/0300792 A1* | 9/2023 | Lei | H04W 76/28 370/329 |

* cited by examiner

UPLINK (UL) TRANSMISSION IN RANDOM ACCESS CHANNEL (RACH) ON FLEXIBLE CELL

TECHNICAL FIELD

Aspects of the present disclosure relate generally to wireless communication systems, and more particularly, to uplink random access channel (RACH) transmission on a flexible cell.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes selecting a first carrier of a flexible cell configuration to transmit an uplink random access channel (RACH) transmission. In aspects the flexible cell configuration includes a plurality of carriers including an anchor carrier and at least one non-anchor carrier. The method further includes transmitting the uplink RACH transmission over the selected first carrier of the flexible cell configuration.

In an additional aspect of the disclosure, a method of wireless communication performed by a base station includes receiving, from a UE, an uplink RACH transmission over a first carrier of a flexible cell configuration configured for the UE. In aspects, the first carrier of the flexible cell configuration is selected by the UE to transmit the uplink RACH transmission to the base station, and the flexible cell configuration configured for the UE includes a plurality of carriers including an anchor carrier and at least one non-anchor carrier. The method further includes transmitting, to the UE, a downlink RACH transmission in response to receiving the uplink RACH transmission.

In an additional aspect of the disclosure, a UE includes at least one processor and a memory coupled to the at least one processor. The at least one processor stores processor-readable code that, when executed by the at least one processor, is configured to perform operations including selecting a first carrier of a flexible cell configuration to transmit an uplink RACH transmission. In aspects the flexible cell configuration includes a plurality of carriers including an anchor carrier and at least one non-anchor carrier. The operations further include transmitting the uplink RACH transmission over the selected first carrier of the flexible cell configuration.

In an additional aspect of the disclosure, a base station includes at least one processor and a memory coupled to the at least one processor. The at least one processor stores processor-readable code that, when executed by the at least one processor, is configured to perform operations including receiving, from a UE, an uplink RACH transmission over a first carrier of a flexible cell configuration configured for the UE. In aspects, the first carrier of the flexible cell configuration is selected by the UE to transmit the uplink RACH transmission to the base station, and the flexible cell configuration configured for the UE includes a plurality of carriers including an anchor carrier and at least one non-anchor carrier. The operations further include transmitting, to the UE, a downlink RACH transmission in response to receiving the uplink RACH transmission.

In an additional aspect of the disclosure, a non-transitory computer-readable medium stores instructions that, when executed by a processor, cause the processor to perform operations. The operations include selecting, by a UE, a first carrier of a flexible cell configuration to transmit an uplink RACH transmission. In aspects the flexible cell configuration includes a plurality of carriers including an anchor carrier and at least one non-anchor carrier. The operations further include transmitting the uplink RACH transmission over the selected first carrier of the flexible cell configuration.

In an additional aspect of the disclosure, a non-transitory computer-readable medium stores instructions that, when executed by a processor, cause the processor to perform operations. The operations include receiving, by a base station from a UE, an uplink RACH transmission over a first carrier of a flexible cell configuration configured for the UE. In aspects, the first carrier of the flexible cell configuration is selected by the UE to transmit the uplink RACH transmission to the base station, and the flexible cell configuration configured for the UE includes a plurality of carriers including an anchor carrier and at least one non-anchor carrier. The operations further include transmitting, by the base station to the UE, a downlink RACH transmission in response to receiving the uplink RACH transmission.

In an additional aspect of the disclosure, an apparatus includes means for selecting, by a UE, a first carrier of a flexible cell configuration to transmit an uplink RACH transmission. In aspects the flexible cell configuration includes a plurality of carriers including an anchor carrier and at least one non-anchor carrier. The apparatus further includes means for transmitting the uplink RACH transmission over the selected first carrier of the flexible cell configuration.

In an additional aspect of the disclosure, an apparatus includes means for receiving, by a base station from a UE, an uplink RACH transmission over a first carrier of a flexible cell configuration configured for the UE. In aspects, the first carrier of the flexible cell configuration is selected by the UE to transmit the uplink RACH transmission to the base station, and the flexible cell configuration configured for the UE includes a plurality of carriers including an anchor carrier and at least one non-anchor carrier. The apparatus further includes means for transmitting, by the base station to the UE, a downlink RACH transmission in response to receiving the uplink RACH transmission.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
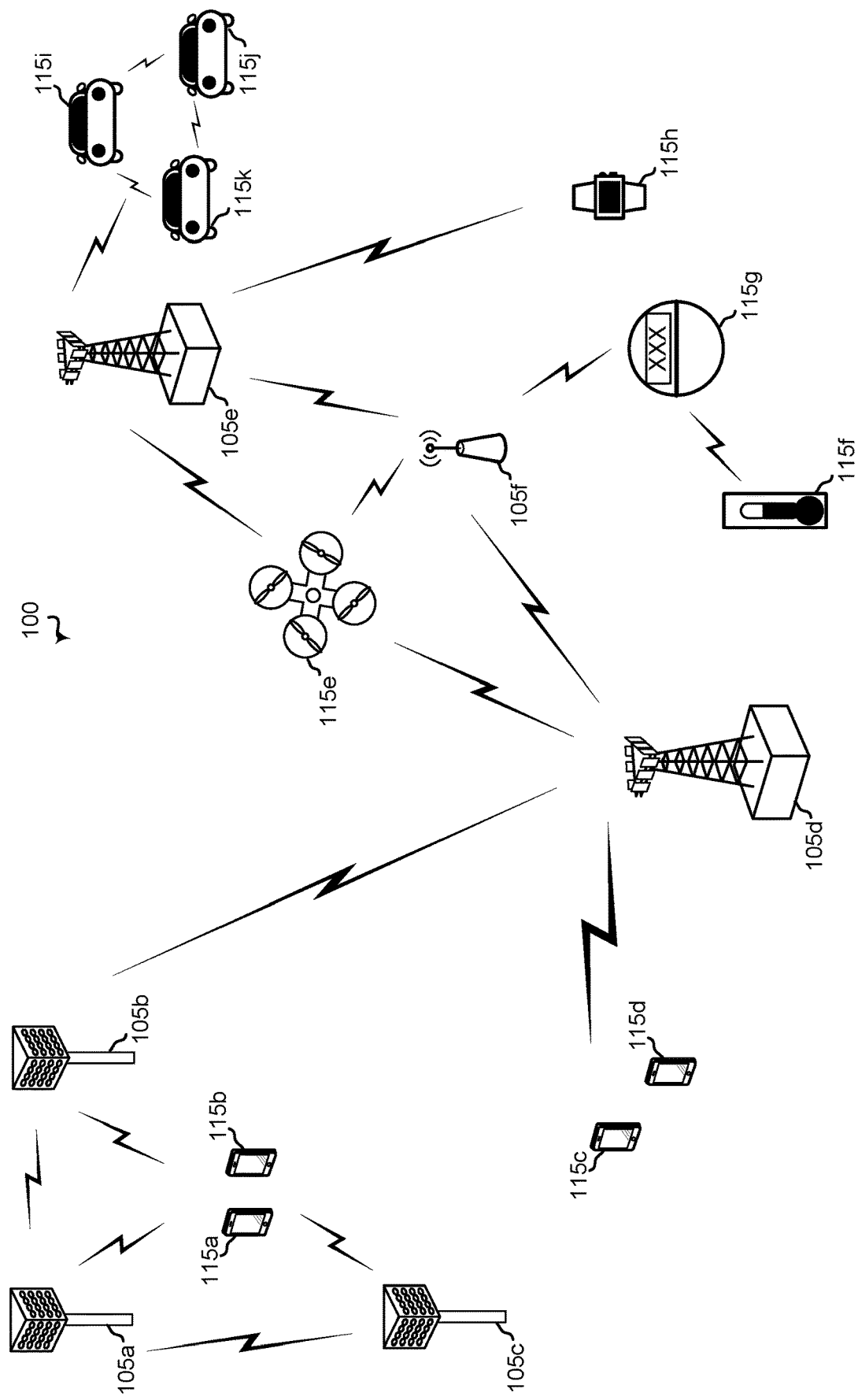
FIG. 1 is a block diagram illustrating example details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks.

The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS, LTE, and NR are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements, etc. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, aggregated or dis-aggregated deployments, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with one or more UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water meter, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
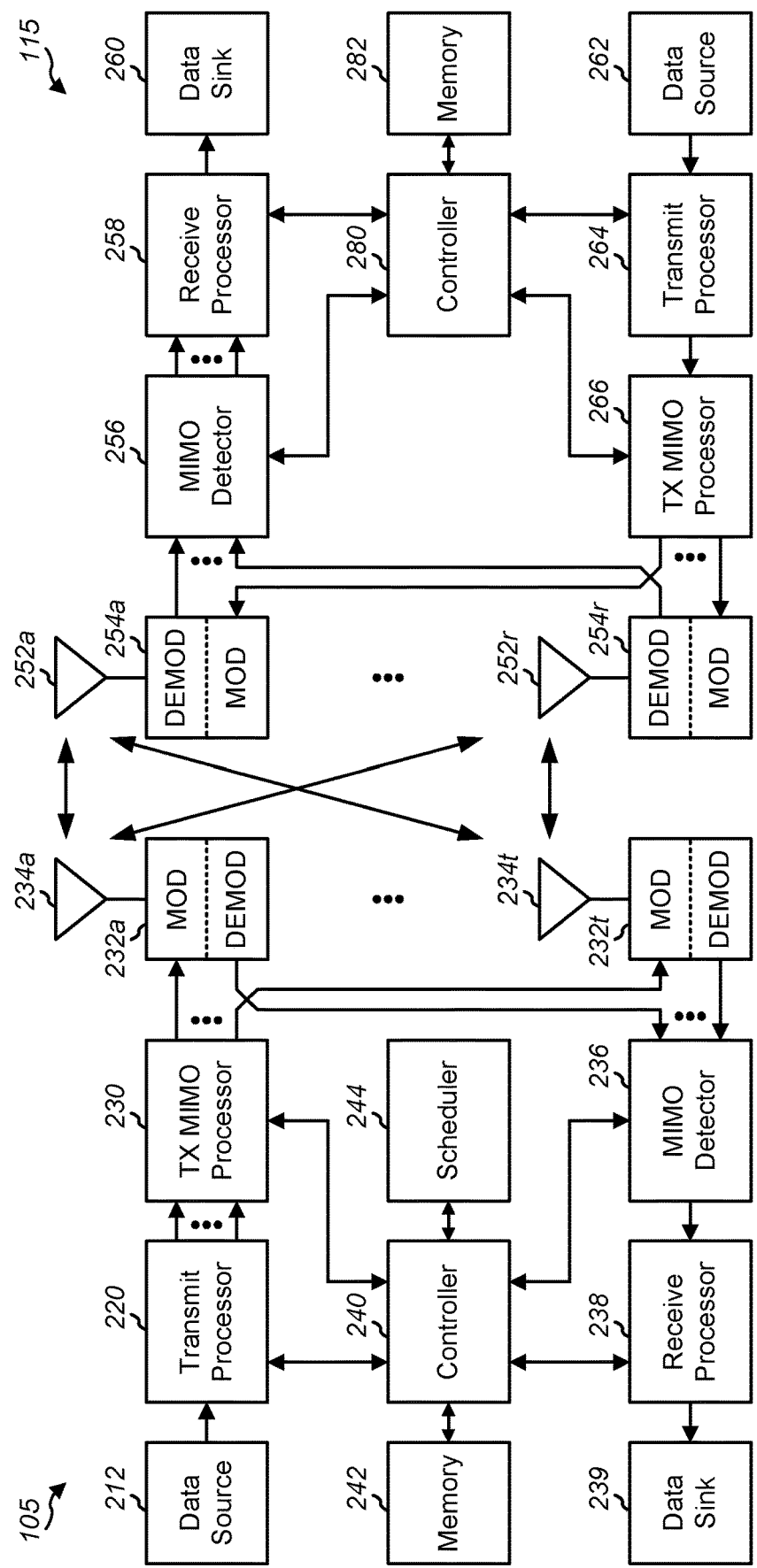
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4 and 5, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Current wireless communication systems implement flexible cell configurations for wireless communications. A flexible cell may include a cell that includes multiple carriers of multiple types. For example, a flexible cell may include any combination of carriers for FDD, TDD and supplemental uplink (SUL) operation. In a typical case, the carriers in a flexible cell configuration are likely non-contiguous. A flexible cell implementation or configuration may enable flexible use of the communication spectrums re-farmed from LTE deployments. The benefits of a flexible cell implementation may include enabling communications over a set of carriers using existing carrier aggregation (CA) frameworks in which the network configures multiple cells separately on the carriers and configures CA for the UE. However, the CA framework may incur high signaling overhead and a complex cell management, which the flexible cell framework is able to avoid.

In current systems, a base station may transmit a synchronization signal block (SSB) and/or system information (SI) only an the anchor carrier. In addition, in current systems, a random access channel (RACH) procedure may be performed over either an anchor carrier or an non-anchor carrier. An SUL operation, where a base station may dynamically schedule a UE to transmit on either a normal uplink (UL) carrier or an SUL carrier, may be considered an example of a flexible cell implementation.

Currently, a RACH procedure may include a 4-step RACH procedure or a 2-step RACH procedure. In a 4-step RACH procedure, a UE may first transmit physical PRACH (PRACH) transmission to a base station. The PRACH transmission may include a Msg1 including a PRACH preamble. The base station may respond by transmitting a downlink transmission (e.g., a PDSCH or a PDCCH) to the UE including a Msg2. The Msg2 may include configuration information such as a timing advance, an uplink grant for a Msg3 transmission, a temporary cell radio network temporary identifier (TC-RNTI), etc. The UE may then transmit a Msg3 in a PUSCH transmission to the base station. The Msg3 may include a radio resource configuration (RRC) connection request, a scheduling request, a buffer status report, etc. After transmission of the Msg3 from the UE to the base station, the base station may transmit a Msg4 in PDSCH or PDCCH to the UE. The Msg4 may include a contention resolution message. The UE may then transmit hybrid automatic repeat request (HARQ) feedback for the Msg4 to the base station, such as an acknowledgement (ACK) or negative-ACK (NACK), as appropriate.

In a 2-step RACH procedure, a UE may first transmit a random access procedure message (MsgA) to a base station in a PRACH and PUSCH transmission. The MsgA may include at least the same information carried in a Msg3 of a 4-step RACH procedure (e.g., RRC request, scheduling request, buffer status report, etc.), and may also carry small data, etc. The base station may respond to the MsgA with a MsgB transmitted in a PDSCH and PDCCH to the UE. The MsgB may include at least information equivalent to the information carried in a Msg2 and Msg4 in a 4-step RACH procedure. The UE may transmit HARQ feedback for the MsgB to the base station.

However, in current wireless communication systems operating in a flexible cell configuration, there is no mechanism to select a carrier for uplink RACH transmissions. For example, a flexible cell configuration may include multiple carriers, including N non-anchor carriers, where N may be larger than 1, in addition to the anchor carrier. The multiple carriers may be FDD, TDD and/or SUL carriers. As noted above, there is currently no mechanism in wireless communication system to select a carrier from among the multiple carriers configured in the flexible cell configuration for a UE for transmitting uplink RACH transmissions (e.g., Msg1 or Msg3 in 4-step RACH, or MsgA in 2-step RACH).

Various aspects of the present disclosure are directed to systems and methods that support mechanisms for uplink carrier selection for uplink RACH transmissions in a flexible cell configuration in a wireless communication system. In aspects, a UE configured with a flexible cell may select at least one carrier for transmitting one or more uplink RACH transmissions to a base station in accordance with aspects of the present disclosure. In some aspects, the base station may transmit an indication to the UE indicating which carrier, and/or which carrier type, the UE is to select and/or use for transmitting the one or more uplink RACH transmission to the base station. In some aspects, the UE may determine the carrier to transmit the one or more uplink RACH transmissions to the base station based on a comparison of measurements of a reference signal received from the base station to predetermined thresholds. In these aspects, based on whether the measurements exceed the predetermined thresholds or not, the UE may select a carrier for transmitting the one or more uplink RACH transmission to the base station. The UE may transmit the uplink RACH transmission to the base station over the selected carrier of the flexible cell configuration.

Figure 3:
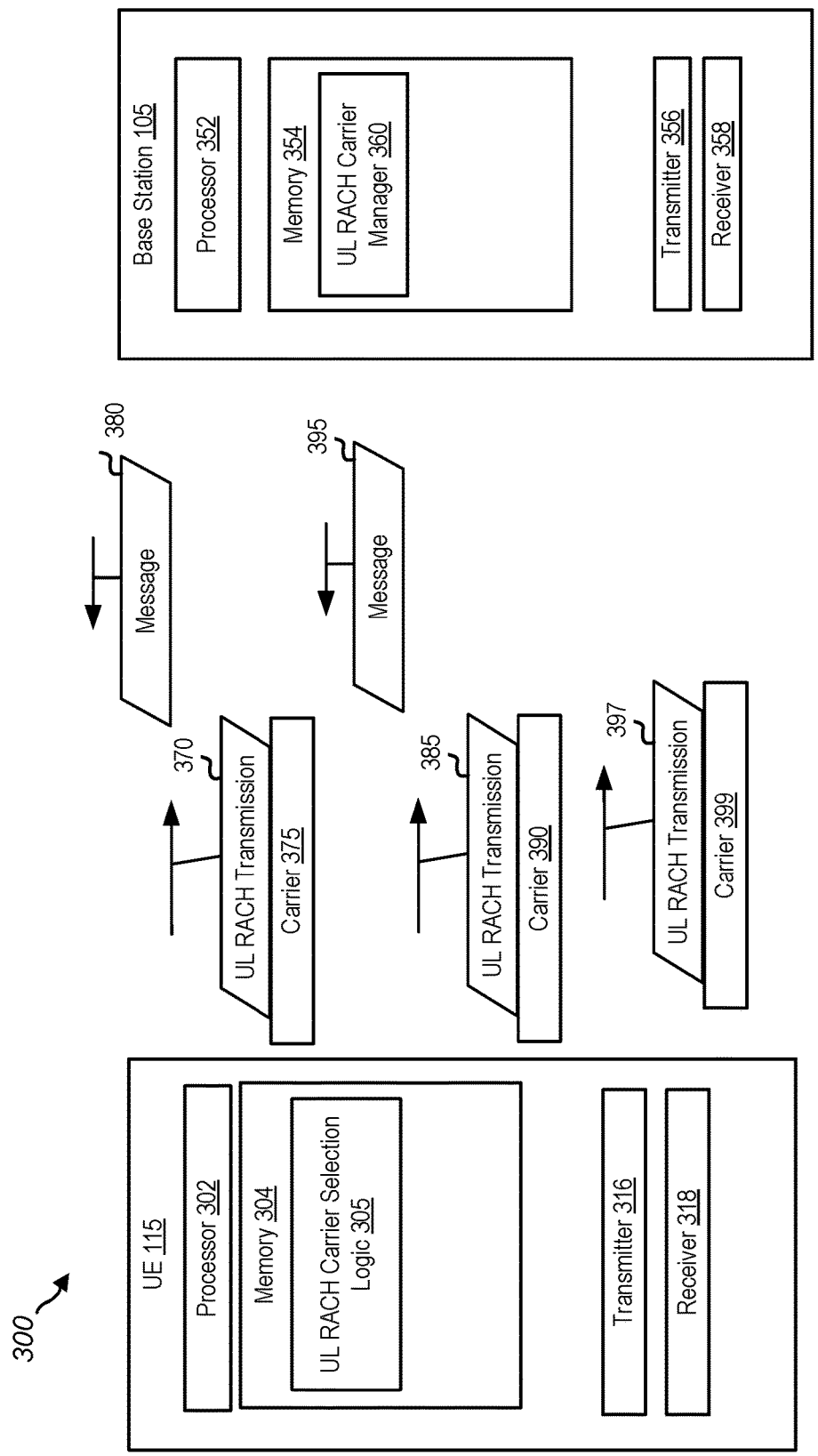
FIG. 3 is a block diagram illustrating an example wireless communication system that supports mechanisms for uplink carrier selection for uplink random access channel (RACH) transmissions in a flexible cell configuration according to one or more aspects.

FIG. 3 is a block diagram of an example wireless communications system 300 that supports mechanisms for uplink carrier selection for uplink RACH transmissions in a flexible cell configuration in a wireless communication system according to one or more aspects. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115, and may include more than one base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), one or more receivers 318 (hereinafter referred to collectively as "receiver 318"), and one or more antenna modules 306 (hereinafter referred to collectively as "antenna module 306"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store uplink RACH carrier selection logic 305. In aspects, uplink RACH carrier selection logic 305 is configured to perform operations for selecting a carrier of a flexible cell configuration for transmitting an uplink RACH transmission in accordance with aspects of the present disclosure.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to uplink RACH carrier manager 360. In aspects, uplink RACH carrier manager 360 is configured to perform operations for determining a carrier of a flexible cell configuration of a UE for transmitting an uplink RACH transmission from the UE to base station 105, and/or for indicating the carrier to be used by the UE for transmitting the uplink RACH transmission to base station 105 in accordance with aspects of the present disclosure.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, UE 115 may select at least one carrier (e.g., carrier 375 and/or carrier 390) of a flexible cell configuration for transmitting one or more uplink RACH transmissions (e.g., uplink RACH transmission 370 and/or uplink RACH transmission 385) to base station 105. For example, UE 115 may be configured with a flexible cell configuration. The flexible cell configuration may include multiple carriers configured for UE 115. In aspects, the multiple carriers configured for UE 115 in the flexible cell configuration may include one or more FDD carriers, one or more TDD carriers, and/or one or more SUL carriers. In addition, the flexible cell configuration of UE 115 may include one anchor carrier and/or one or more non-anchor carriers. In aspects, UE 115 may be configured to select at least one of the carriers of the flexible cell configuration for transmitting one or more uplink RACH transmissions to base station 105.

During operation of wireless communications system 300, UE 115 may transmit the one or more uplink RACH transmissions to base station 105 using the selected at least one carrier of the flexible cell configuration.

In aspects, UE 115 may be configured to perform RACH operations using the flexible cell configuration. For example, UE 115 may be configured to transmit uplink RACH transmissions using at least one of the multiple carriers configured for UE 115 in the flexible cell configuration. The RACH operations may include a 4-step RACH procedure or a 2-step RACH procedure. In the case of a 4-step RACH procedure, UE 115 may be configured to transmit uplink RACH transmissions, such as transmitting Msg1 and/or Msg3 to base station 105 using the multiple carriers configured for UE 115 in the flexible cell configuration. In some aspects, UE 115 may select a first carrier of the flexible cell configuration for transmitting a Msg1, and may select a second carrier of the flexible cell configuration for transmitting a Msg3. In some cases, the first carrier and the second carrier may be the same carrier of the flexible cell configuration, or may be different carriers of the flexible cell configuration. In the case of a 2-step RACH procedure, UE 115 may be configured to transmit uplink RACH transmissions, such as transmitting MsgA to base station 105 using the multiple carriers configured for UE 115 in the flexible cell configuration. For example, UE 115 may select at least one carrier of the flexible cell configuration to transmit the MsgA to base station 105.

In aspects, selecting at least one carrier for transmitting one or more uplink RACH transmissions from UE 115 to base station 105 may depend on the type of uplink RACH transmission to be transmitted. For example, UE 115 may transmit uplink RACH transmission 370. In the case where uplink RACH transmission 370 is a Msg1 PRACH transmission of a 4-step RACH procedure, or in the case where uplink RACH transmission 370 is a MsgA transmission in a 2-step RACH procedure, UE 115 may select the carrier (e.g., carrier 375), from the flexible cell configuration of UE 115, to transmit uplink RACH transmission 370 in accordance with some aspects.

In these aspects, UE 115 may be configured to select carrier 375 of the flexible cell configuration for transmitting uplink RACH transmission 370 (e.g., including the Msg1 of a 4-step RACH procedure or the MsgA of a 2-step RACH procedure) based on an explicit indication to UE 115 of which carrier of the flexible cell configuration to select. For example, base station 105 may determine that UE 115 is to use carrier 375 of the flexible cell configuration of UE 115 for transmitting uplink RACH transmission 370 to base station 105. In aspects, base station 105 may transmit an explicit indication to UE 105 that carrier 375 of the flexible cell configuration of UE 115 is to be selected by UE 115 for transmitting uplink RACH transmission 370 to base station 105. In aspects, the explicit indication may be included in an SI message or an RRC message from base station 105 to UE 115. For example, base station 105 may transmit message 380 to UE 115, including the explicit indication that UE 115 is to select carrier 375 for transmitting uplink RACH transmission 370 to base station 105. In aspects, the explicit indication of carrier 375 may include a carrier ID of carrier 375. For example, in aspects, each carrier associated with a carrier ID may be configured in SI and/or RRC. In this manner, base station 105 may configure, in an SI or RRC message, a carrier ID of carrier 375, and UE 115 may use the indication of the carrier ID as an explicit indication that carrier 375 is to be selected for transmitting uplink RACH transmission 370 (e.g., including the Msg1 of a 4-step RACH procedure or the MsgA of a 2-step RACH procedure) to base station 105.

It is noted that in current SUL operation, an optional indication is used to indicate to the UE whether an SUL carrier may be used for PRACH transmission. In aspects, the explicit indication of the carrier that UE 115 is to select for transmitting the Msg1 of a 4-step RACH procedure or the MsgA of a 2-step RACH procedure to base station 105 in accordance with aspects of the present disclosure is a different, and in some cases separate, indication that the legacy SUL carrier indication of current systems.

In aspects, UE 115 may be configured to select carrier 375 of the flexible cell configuration for transmitting uplink RACH transmission 370 (e.g., including the Msg1 of a 4-step RACH procedure or the MsgA of a 2-step RACH procedure) based on measurements of a downlink reference signal. For example, in some cases, no explicit indication of a carrier selection for transmitting uplink RACH transmission 370 may be received from base station 105. In this case, UE 115 may select the carrier of the flexible cell configuration for transmitting uplink RACH transmission 370 by obtaining measurements of a downlink reference signal received from base station 105. In aspects, the reference signal may include any downlink pathloss references signal (e.g., an SSB reference signal, a sounding reference signal, etc.). In these aspects, UE 115 may receive the downlink reference signal from base station 105 and may take measurements (e.g., reference signal received power (RSRP)) on the downlink reference signal. UE 115 may compare the measurements obtained from the downlink reference signal to one or more thresholds, and, based on the comparing, UE 115 may select carrier 375 for transmitting uplink RACH transmission 370 to base station 105.

In aspects, UE 115 may select carrier 375 for transmitting uplink RACH transmission 370 to base station 105 based on a comparison of the downlink reference signal measurements obtained by UE 115 to a single threshold (e.g., RSRP threshold). For example, UE 115 may be configured (e.g., based on pre-configuration, and/or based on configuration by base station 105) with a single RSRP threshold. In these cases, UE 115 may be configured to determine, for each carrier of the flexible cell configuration, whether the downlink reference signal measurement exceeds the single RSRP threshold or not. Where the reference signal measurement for a particular carrier (e.g., the anchor carrier in a typical implementation) exceeds the single RSRP threshold, the particular carrier is included in a subset of carriers from which UE 115 is to select carrier 375 for transmitting uplink RACH transmission 370 to base station 105. Where the reference signal measurement for a particular carrier does not exceed the single RSRP threshold, the particular carrier is excluded from the subset of carriers from which UE 115 is to select carrier 375 for transmitting uplink RACH transmission 370 to base station 105. This may be performed for each carrier of the flexible cell configuration of UE 115 to generate the subset of carriers. UE 115 may then select carrier 375 for transmitting uplink RACH transmission 370 to base station 105 from the subset of carriers. In aspects, selecting carrier 375 for transmitting uplink RACH transmission 370 to base station 105 from the subset of carriers may include selecting the carrier in the subset with the lowest ID value. In aspects, the carrier having a carrier ID with the lowest ID value may have the lowest frequency in the subset of carriers.

In aspects, the single RSRP threshold may be a legacy threshold configured for legacy supplementary carrier selection (e.g., rsrp-ThresholdSSB-SUL), or may be a new RACH uplink carrier selection threshold.

In aspects, UE 115 may be configured (e.g., based on pre-configuration, and/or based on configuration by base station 105) with a plurality of RSRP thresholds for selecting the carrier for transmitting uplink RACH transmission 370 to base station 105. In aspects, the plurality of RSRP thresholds may be mapped to the carriers of the flexible cell configuration. For example, in aspects, a mapping between the plurality of RSRP thresholds and subsets of the carriers of the flexible cell configuration may be based on where the downlink reference signal measurements fall within the range of the RSRP thresholds of the plurality of RSRP thresholds. For example, UE 115 may determine a subset of carriers based on where the downlink reference signal measurements fall within the range of the RSRP thresholds of the plurality of RSRP thresholds. UE 115 may then select carrier 375 for transmitting uplink RACH transmission 370 to base station 105 from one of the determined subsets. For example, in an illustrative example, UE 155 may be configured with two thresholds T1 and T2, where T1<T2. In this example, when the downlink reference signal measurement (e.g., the RSRP measurement of the downlink reference signal) is less than T1, UE 115 may determine the subset of carriers from which carrier 375 is to be selected to be a first subset of carriers (e.g., subset of carriers {f1, f2, . . . , fk}). In this same example, when the downlink reference signal measurement (e.g., the RSRP measurement of the downlink reference signal) is greater than or equal to T1, but less than T2, UE 115 may determine the subset of carriers from which carrier 375 is to be selected to be a second subset of carriers (e.g., subset of carriers {f{k+1}, f{k+2}, . . . , f{2k}}, where fk<f{k+1}). In still this same example, when the downlink reference signal measurement (e.g., the RSRP measurement of the downlink reference signal) is greater than or equal to T2, UE 115 may determine the subset of carriers from which carrier 375 is to be selected to be a third subset of carriers (e.g., subset of carriers {f{2k+1}, f{2k+2}, . . . , f{N+1}}). In this, the subset of carriers from within which carrier 375 is to be selected by UE 115 may be determined based on where the downlink reference signal measurement lands within the range formed by the one or more RSRP thresholds. In some aspects, one of the one or more RSRP thresholds may be the legacy threshold configured for legacy supplementary carrier selection (e.g., rsrp-ThresholdSSB-SUL).

It will be appreciated that the discussion of two thresholds is merely for illustrative purposes, and not intended to be limiting in any way. Indeed, in some cases, UE 115 may be configured with more than two thresholds, and operations in accordance with aspects of the present disclosure include determining a carrier to be used to transmit the uplink RACH transmission based on where downlink reference signal measurements fall within the range of the more than two thresholds, as described above.

As in the case of a single RSRP threshold, UE 115 may then select carrier 375 for transmitting uplink RACH transmission 370 to base station 105 from the subset of carriers determined based on where the downlink reference signal measurement lands within the range formed by the one or more RSRP thresholds. In aspects, selecting carrier 375 for transmitting uplink RACH transmission 370 to base station 105 from the determined subset of carriers may include selecting the carrier in the subset with the lowest ID value. In aspects, the carrier having a carrier ID with the lowest ID value may have the lowest frequency in the subset of carriers.

As noted above, in aspects, selecting at least one carrier of the flexible cell configuration for transmitting one or more uplink RACH transmissions from UE 115 to base station 105 may depend on the type of uplink RACH transmission to be transmitted. For example, UE 115 may transmit uplink RACH transmission 385. Uplink RACH transmission 385 may be a Msg3 PUSCH transmission of a 4-step RACH procedure. In aspects, UE 115 may select the carrier (e.g., carrier 390), from the flexible cell configuration of UE 115, to transmit uplink RACH transmission 385 in accordance with some aspects.

In these aspects, UE 115 may be configured to select carrier 390 of the flexible cell configuration for transmitting uplink RACH transmission 385 (e.g., including the Msg3 of a 4-step RACH procedure) to be the same as carrier 375 selected for transmitting uplink RACH transmission 370. In this case, UE 115 may simply select the same carrier (e.g., carrier 375) for transmitting uplink RACH transmission 385 because carrier 375 was selected to transmit uplink RACH transmission 370. This may provide some performance gains to UE 115 as UE 115 does not have to perform additional steps to determine the carrier (e.g., carrier 390) of the flexible cell configuration for transmitting uplink RACH transmission 385.

In aspects, UE 115 may be configured to select carrier 390 of the flexible cell configuration for transmitting uplink RACH transmission 385 (e.g., including the Msg3 of a 4-step RACH procedure) based on an indication to UE 115 of which carrier of the flexible cell configuration to select for transmitting uplink RACH transmission 385 to base station 105. For example, base station 105 may determine that UE 115 is to use carrier 390 of the flexible cell configuration of UE 115 for transmitting uplink RACH transmission 385 to base station 105. In aspects, base station 105 may transmit the indication to UE 105 that carrier 390 of the flexible cell configuration of UE 115 is to be selected by UE 115 for transmitting uplink RACH transmission 385 to base station 105. In aspects, the indication may be included in downlink control information (DCI) message (e.g., a DCI format 1_0 message with cyclic redundancy code (CRC) scrambled by random access (RA)-RNTI) transmitted from base station 105 to UE 115. In these aspects, one or more reserved bits of the DCI message may be used to include the indication to the UE of which carrier (e.g., carrier 390) UE 115 is to select for transmitting uplink RACH transmission 385 to base station 105. In aspects, the indication of carrier 390 may be included in a Msg3/RACH response (RAR) message transmitted from base station 105 to UE 115 as part of the RACH procedure. In aspects, the indication may be included in a field of a RAR medium access control (MAC)-RAR header and/or in a RAR MACK payload field.

In aspects, UE 115 may transmit uplink RACH transmission 397. Uplink RACH transmission 397 may be a retransmission of a Msg3 PUSCH transmission of a 4-step RACH procedure (e.g., a retransmission of uplink RACH transmission 385). In aspects, UE 115 may select the carrier (e.g., carrier 399), from the flexible cell configuration of UE 115, to transmit uplink RACH transmission 397 in accordance with some aspects.

In these aspects, UE 115 may be configured to select carrier 399 of the flexible cell configuration for transmitting uplink RACH transmission 397 (e.g., including a Msg3 retransmission) to be the same as carrier 390 selected for transmitting uplink RACH transmission 385. In other aspects, UE 115 may be configured to select carrier 399 of the flexible cell configuration for transmitting uplink RACH transmission 397 based on an indication to UE 115 of which carrier of the flexible cell configuration to select for transmitting uplink RACH transmission 397 to base station 105. For example, base station 105 may determine that UE 115 is to use carrier 399 of the flexible cell configuration of UE 115 for transmitting uplink RACH transmission 397 to base station 105. In aspects, base station 105 may transmit the indication to UE 105 that carrier 399 of the flexible cell configuration of UE 115 is to be selected by UE 115 for transmitting uplink RACH transmission 397 to base station 105. In aspects, the indication may be included in DCI message (e.g., a DCI format 0_0 message with CRC scrambled by TC-RNTI) transmitted from base station 105 to UE 115. In these aspects, one or more reserved bits of the DCI message may be repurposed or used by base station 105 to include the indication to the UE of which carrier (e.g., carrier 399) UE 115 is to select for transmitting uplink RACH transmission 397 to base station 105. In aspects, the one or more reserved fields of the DCI message may include a HARQ process number field, a new data indicator field, etc.

During operation of wireless communications system 300, base station transmits, to UE 115, one or more downlink RACH transmissions in response to receiving the one or more uplink RACH transmission from UE 115. For example, in a 4-step RACH procedure, base station 105 may transmit a Msg2 to UE 115 in response to receiving a Msg1, and/or a Msg4 in response to receiving a Msg3. In a 2-step RACH procedure, base station 105 may transmit a MsgB to UE 115 in response to receiving a MsgA from UE 115.

Figure 4:
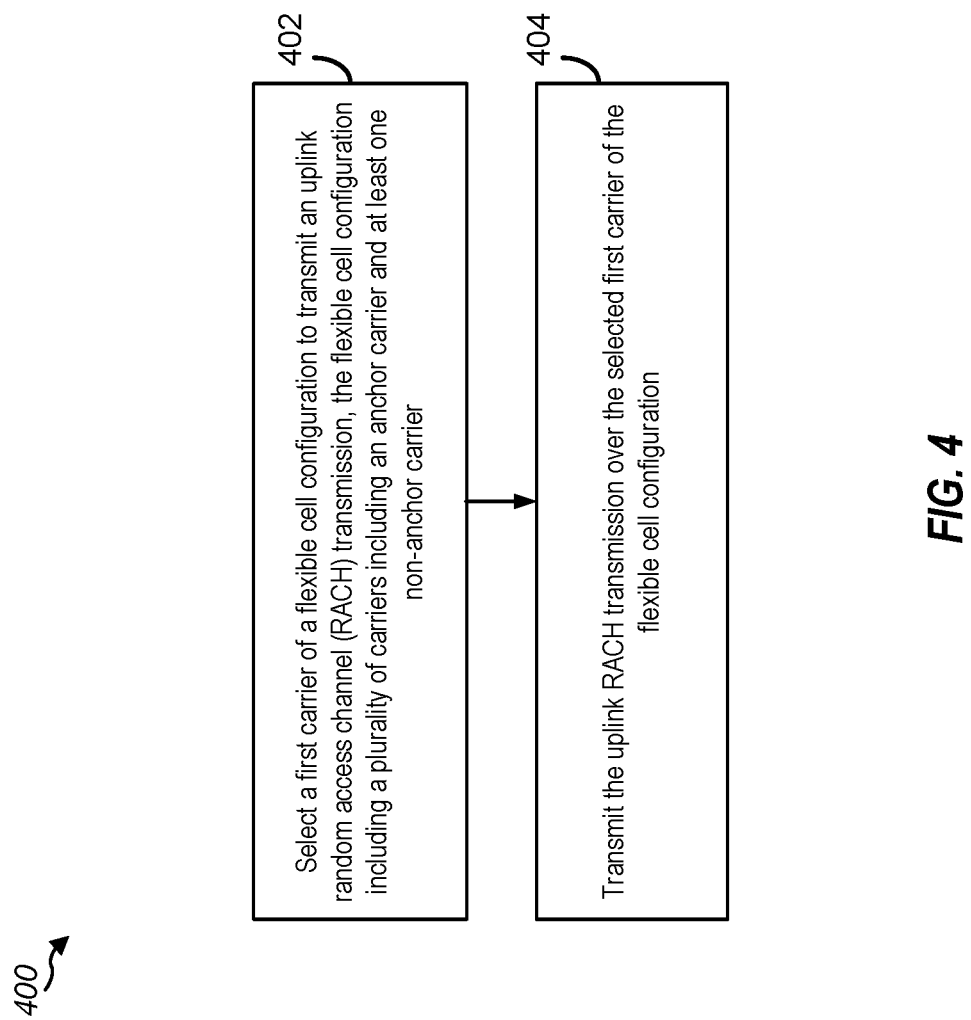
FIG. 4 is a flow diagram illustrating an example process that supports mechanisms for uplink carrier selection for uplink RACH transmissions in a flexible cell configuration according to one or more aspects.
Figure 6:
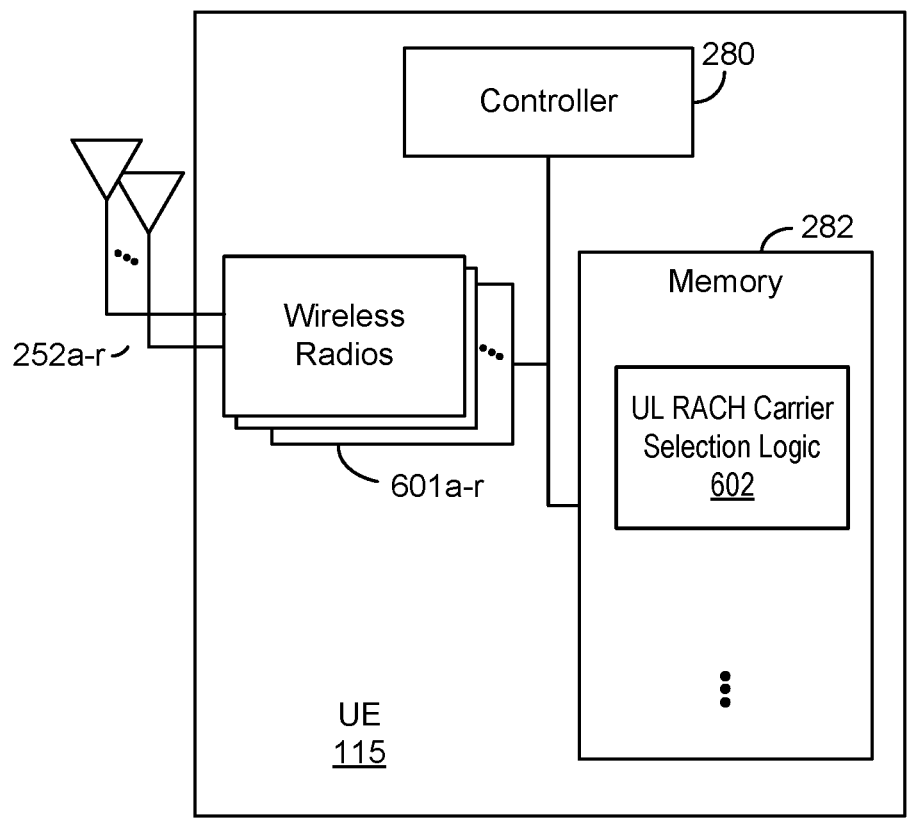
FIG. 6 is a block diagram of an example UE that supports mechanisms for uplink carrier selection for uplink RACH transmissions in a flexible cell configuration according to one or more aspects.

FIG. 4 is a flow diagram illustrating an example process 400 that provides for mechanisms for uplink carrier selection for uplink RACH transmissions in a flexible cell configuration in a wireless communication system according to one or more aspects. Operations of process 400 may be performed by a UE, such as UE 115 described above with reference to FIGS. 1-3. For example, example operations (also referred to as "blocks") of process 400 may enable UE 115 to support mechanisms for uplink carrier selection for uplink RACH transmissions in a flexible cell configuration. FIG. 6 is a block diagram illustrating UE 115 configured according to aspects of the present disclosure. UE 115 includes the structure, hardware, and components as illustrated in FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 601a-r and antennas 252a-r. Wireless radios 601a-r includes various components and hardware, as illustrated in FIG. 2, including modulator/demodulators 254a-r, MIMO detector 256, receive processor 258, transmit processor 264, and TX MIMO processor 266.

At block 402 of process 400, a UE (e.g., UE 115) selects a first carrier of a flexible cell configuration to transmit an uplink RACH transmission. In aspects, the flexible cell configuration may include a plurality of carriers including an anchor carrier and at least one non-anchor carrier. In order to implement the functionality for such operations, UE 115, under control of controller/processor 280, executes uplink RACH carrier selection logic 602, stored in memory 282. The functionality implemented through the execution environment of uplink RACH carrier selection logic 602 allows for UE 115 to perform operations to select a first carrier of a flexible cell configuration to transmit an uplink RACH transmission according to the various aspects herein. In aspects, UE 115 may perform operations to select a first carrier of a flexible cell configuration to transmit an uplink RACH transmission according to operations and functionality as described above with reference to UE 115 and as illustrated in FIGS. 1-3.

At block 404 of process 400, a UE (e.g., UE 115) transmits the uplink RACH transmission over the selected first carrier of the flexible cell configuration. In order to implement the functionality for such operations, UE 115, under control of controller/processor 280, may transmit the uplink RACH transmission over the selected first carrier of the flexible cell configuration via wireless radios 601a-r and antennas 252a-r. In aspects, UE 115 may perform operations to transmit the uplink RACH transmission over the selected first carrier of the flexible cell configuration according to operations and functionality as described above with reference to UE 115 and as illustrated in FIGS. 1-3.

Figure 5:
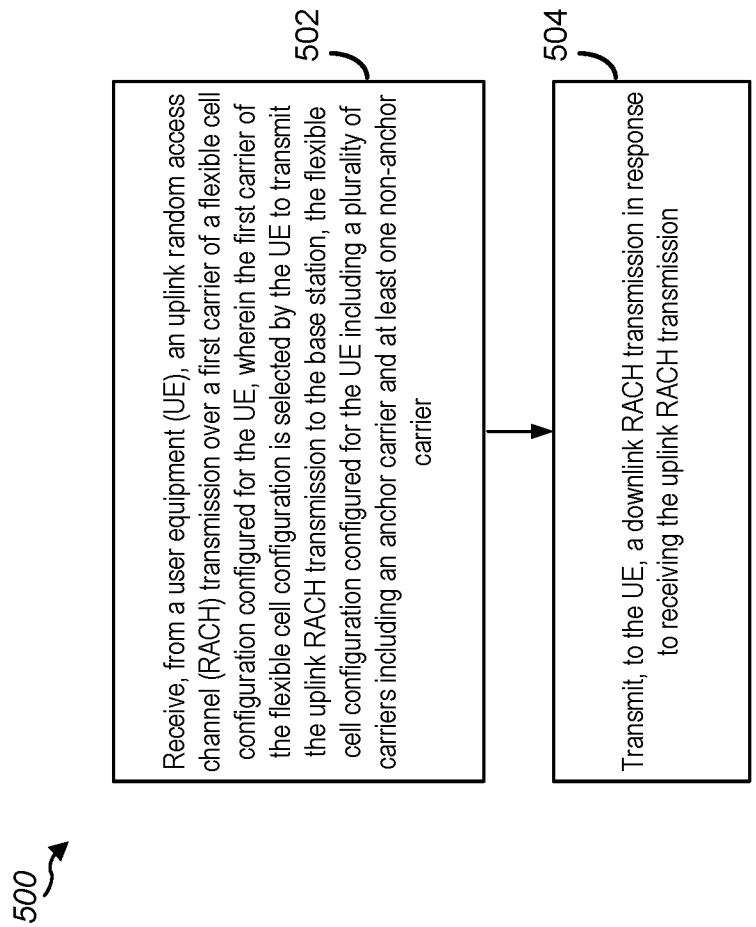
FIG. 5 is a flow diagram illustrating an example process that supports mechanisms for uplink carrier selection for uplink RACH transmissions in a flexible cell configuration according to one or more aspects.
Figure 7:
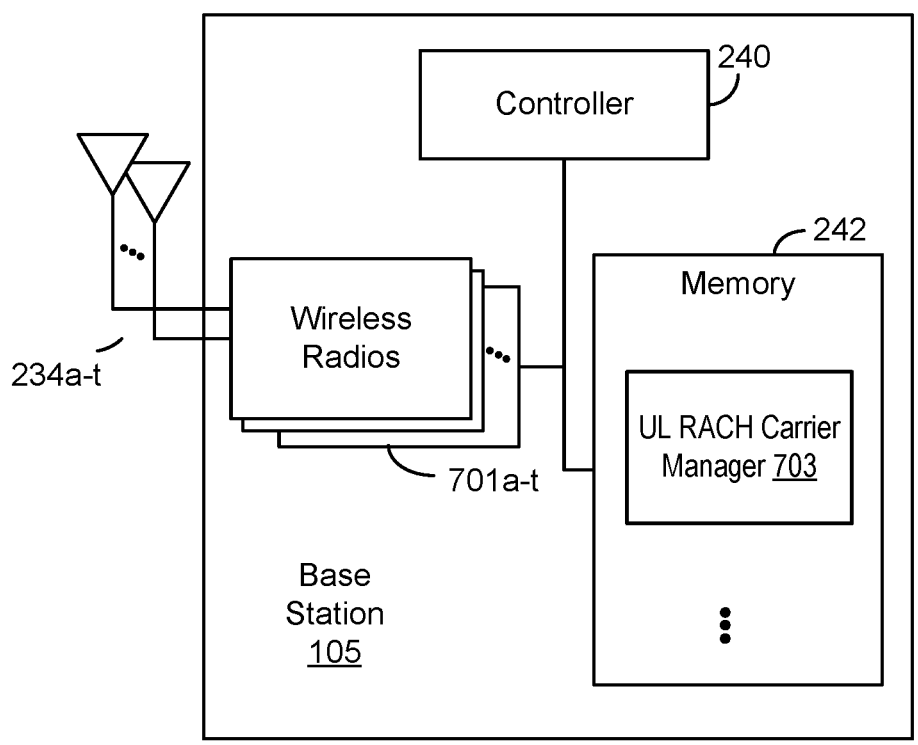
FIG. 7 is a block diagram of an example base station that supports mechanisms for uplink carrier selection for uplink RACH transmissions in a flexible cell configuration according to one or more aspects.

FIG. 5 is a block diagram illustrating an example an example process 500 that provides for mechanisms for uplink carrier selection for uplink RACH transmissions in a flexible cell configuration in a wireless communication system according to one or more aspects. Operations of process 500 may be performed by a base station, such as base station 105 described above with reference to FIGS. 1-3, or described with reference to FIG. 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 701a-t and antennas 234a-t. Wireless radios 701a-t includes various components and hardware, as illustrated in FIG. 2 for base station 105, including modulator/demodulators 232a-t, MIMO detector 236, receive processor 238, transmit processor 220, and TX MIMO processor 230.

At block 502 of process 500, a base station (e.g., base station 105) receives, from a UE, an uplink RACH transmission over a first carrier of a flexible cell configuration configured for the UE. In aspects, the first carrier of the flexible cell configuration is selected by the UE to transmit the uplink RACH transmission to the base station. In aspects, the flexible cell configuration configured for the UE includes a plurality of carriers including an anchor carrier and at least one non-anchor carrier. In order to implement the functionality for such operations, the base station, under control of controller/processor 240, may receive the uplink RACH transmission over a first carrier of a flexible cell configuration configured for the UE via wireless radios 701a-r and antennas 234a-t. In aspects, base station 105 may perform operations to receive the uplink RACH transmission over a first carrier of a flexible cell configuration configured for the UE according to operations and functionality as described above with reference to base station 105 and as illustrated in FIGS. 1-3.

At block 502 of process 500, base station 105 transmits, to the UE, a downlink RACH transmission in response to receiving the uplink RACH transmission. In order to implement the functionality for such operations, the base station, under control of controller/processor 240, may transmit, to the UE, a downlink RACH transmission in response to receiving the uplink RACH transmission via wireless radios 701a-r and antennas 234a-t. In aspects, base station 105 may perform operations to transmit, to the UE, a downlink RACH transmission in response to receiving the uplink RACH transmission according to operations and functionality as described above with reference to base station 105 and as illustrated in FIGS. 1-3.

In one or more aspects, techniques for supporting mechanisms for uplink carrier selection for uplink RACH transmissions in a flexible cell configuration in a wireless communication system according to one or more aspects may include additional aspects, such as any single aspect or any combination of aspects described below or in connection with one or more other processes or devices described elsewhere herein. In a first aspect, supporting mechanisms for uplink carrier selection for uplink RACH transmissions in a flexible cell configuration in a wireless communication system may include an apparatus configured to select a first carrier of a flexible cell configuration to transmit an uplink RACH transmission, the flexible cell configuration including a plurality of carriers including an anchor carrier and at least one non-anchor carrier, and to transmit the uplink RACH transmission over the selected first carrier of the flexible cell configuration. Additionally, the apparatus may perform or operate according to one or more aspects as described below. In some implementations, the apparatus includes a wireless device, such as a UE (e.g., UE 115 as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, selecting the first carrier of the flexible cell configuration to transmit the uplink RACH transmission includes receiving, from a base station, a configuration of each carrier of the plurality of carriers of the flexible cell configuration, the configuration including at least a carrier ID for each carrier of the plurality of carriers of the flexible cell configuration.

In a third aspect, alone or in combination with the second aspect, selecting the first carrier of the flexible cell configuration to transmit the uplink RACH transmission includes receiving, from the base station, an indication of a carrier ID associated with the first carrier of the flexible cell configuration that the UE is to select to transmit the uplink RACH transmission.

In a fourth aspect, alone or in combination with one or more of the second aspect through the third aspect, selecting the first carrier of the flexible cell configuration to transmit the uplink RACH transmission includes selecting the first carrier of the flexible cell configuration to transmit the uplink RACH transmission based on the indicated carrier ID.

In a fifth aspect, alone or in combination with one or more of the first aspect through the fourth aspect, the configuration of each carrier of the plurality of carriers and the indication of the carrier ID associated with the first carrier of the flexible cell configuration is received in one or more of an SI message, or an RRC message.

In a sixth aspect, alone or in combination with one or more of the first aspect through the fifth aspect, selecting the first carrier of the flexible cell configuration to transmit the uplink RACH transmission includes receiving, from a base station, a reference signal.

In a seventh aspect, alone or in combination with the sixth aspect, selecting the first carrier of the flexible cell configuration to transmit the uplink RACH transmission includes obtaining at least one measurement associated with the reference signal.

In an eighth aspect, alone or in combination with one or more of the sixth aspect through the seventh aspect, selecting the first carrier of the flexible cell configuration to transmit the uplink RACH transmission includes comparing the at least one measurement to one or more thresholds.

In a ninth aspect, alone or in combination with one or more of the sixth aspect through the eighth aspect, selecting the first carrier of the flexible cell configuration to transmit the uplink RACH transmission includes selecting the first carrier of the flexible cell configuration to transmit the uplink RACH transmission based on the comparing of the at least one measurement to the one or more thresholds.

In a tenth aspect, alone or in combination with one or more of the first aspect through the ninth aspect, selecting the first carrier of the flexible cell configuration to transmit the uplink RACH transmission based on the comparing of the at least one measurement to the one or more thresholds includes selecting a supplementary uplink carrier when the at least one measurement does not exceed the one or more thresholds.

In an eleventh aspect, alone or in combination with one or more of the first aspect through the tenth aspect, selecting the first carrier of the flexible cell configuration to transmit the uplink RACH transmission based on the comparing of the at least one measurement to the one or more thresholds includes selecting a normal uplink carrier when the at least one measurement exceeds the one or more thresholds.

In a twelfth aspect, alone or in combination with one or more of the first aspect through the eleventh aspect, the at least one measurement includes an RSRP.

In a thirteenth aspect, alone or in combination with one or more of the first aspect through the twelfth aspect, the one or more thresholds includes a single threshold.

In a fourteenth aspect, alone or in combination with the thirteenth aspect, the single threshold includes one of a legacy threshold configured for legacy supplementary carrier selection, or a new RACH uplink carrier selection threshold.

In a fifteenth aspect, alone or in combination with one or more of the first aspect through the fourteenth aspect, the one or more thresholds includes a plurality of thresholds.

In a sixteenth aspect, alone or in combination with the fifteenth aspect, selecting the first carrier of the flexible cell configuration to transmit the uplink RACH transmission based on the comparing of the at least one measurement to the one or more thresholds includes determining a subset of carriers of the plurality of carriers based on the comparing.

In a seventeenth aspect, alone or in combination with one or more of the fifteenth aspect through the sixteenth aspect, selecting the first carrier of the flexible cell configuration to transmit the uplink RACH transmission based on the comparing of the at least one measurement to the one or more thresholds includes selecting the first carrier of the flexible cell configuration to transmit the uplink RACH transmission from the subset of carriers.

In an eighteenth aspect, alone or in combination with one or more of the first aspect through the seventeenth aspect, determining the subset of carriers of the plurality of carriers based on the comparing includes determining the subset of carriers to include a first subset of the plurality of carriers when the at least one measurement does not exceed a first threshold of the plurality of thresholds.

In a nineteenth aspect, alone or in combination with the eighteenth aspect, determining the subset of carriers of the plurality of carriers based on the comparing includes determining the subset of carriers to include a second subset of the plurality of carriers when the at least one measurement does not exceed a second threshold of the plurality of thresholds, the second threshold larger than the first threshold, and the second subset of the plurality of carriers different than the first subset of the plurality of carriers.

In a twentieth aspect, alone or in combination with one or more of the eighteenth aspect through the nineteenth aspect, determining the subset of carriers of the plurality of carriers based on the comparing includes determining the subset of carriers to include a third subset of the plurality of carriers when the at least one measurement exceeds the second threshold of the plurality of thresholds, the third subset of the plurality of carriers different than the second subset of the plurality of carriers.

In a twenty-first aspect, alone or in combination with one or more of the first aspect through the twentieth aspect, selecting the first carrier of the flexible cell configuration to transmit the uplink RACH transmission from the subset of carriers includes selecting a carrier having a carrier ID with a lowest value in the in the subset of carriers.

In a twenty-second aspect, alone or in combination with the twenty-first aspect, the carrier having the carrier ID with the lowest value is a carrier with the lowest frequency in the subset of carriers.

In a twenty-third aspect, alone or in combination with one or more of the first aspect through the twenty-second aspect, the techniques of the first aspect include transmitting another uplink RACH transmission over a second carrier of the flexible cell configuration.

In a twenty-fourth aspect, alone or in combination with the twenty-third aspect, the another uplink RACH transmission is a RACH transmission subsequent to the uplink RACH transmission.

In a twenty-fifth aspect, alone or in combination with one or more of the first aspect through the twenty-fourth aspect, the second carrier of the flexible cell configuration over which the another uplink RACH transmission is transmitted is the first carrier of the flexible cell configuration over which the uplink RACH transmission is transmitted.

In a twenty-sixth aspect, alone or in combination with one or more of the first aspect through the twenty-fifth aspect, the second carrier of the flexible cell configuration over which the another uplink RACH transmission is transmitted is indicated in a downlink message received from a base station prior to transmitting the another uplink RACH transmission.

In a twenty-seventh aspect, alone or in combination with the twenty-sixth aspect, the downlink message includes one or more of a DCI message, or a Msg2 RAR message.

In a twenty-eighth aspect, alone or in combination with one or more of the first aspect through the twenty-seventh aspect, the techniques of the first aspect include selecting a third carrier of the flexible cell configuration to retransmit the uplink RACH transmission based on an indication received from a base station in a repurposed reserved field of a DCI message.

In a twenty-ninth aspect, alone or in combination with one or more of the first aspect through the twenty-eighth aspect, the uplink RACH transmission includes one or more of a PRACH transmission in a 4-step RACH procedure, a Msg3 transmission in a 4-step RACH procedure, a MsgA transmission in a 2-step RACH procedure, or a Msg3 retransmission.

In a thirtieth aspect, techniques for supporting mechanisms for uplink carrier selection for uplink RACH transmissions in a flexible cell configuration in a wireless communication system may include an apparatus configured to receive, from a UE, an uplink RACH transmission over a first carrier of a flexible cell configuration configured for the UE. In aspects, the first carrier of the flexible cell configuration is selected by the UE to transmit the uplink RACH transmission to the base station, and the flexible cell configuration configured for the UE includes a plurality of carriers including an anchor carrier and at least one non-anchor carrier. The apparatus is further configured to transmit, to the UE, a downlink RACH transmission in response to receiving the uplink RACH transmission. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirty-first aspect, alone or in combination with the thirtieth aspect, the techniques of the thirtieth aspect include transmitting, to the UE, a configuration of each carrier of the plurality of carriers of the flexible cell configuration configured for the UE, the configuration including at least a carrier ID for each carrier of the plurality of carriers of the flexible cell configuration.

In a thirty-second aspect, alone or in combination with the thirty-first aspect, the techniques of the thirtieth aspect include transmitting, to the UE, an indication of a carrier ID associated with the first carrier of the flexible cell configuration that the UE is to select to transmit the uplink RACH transmission.

In a thirty-third aspect, alone or in combination with one or more of the thirty-first aspect through the thirty-second aspect, the UE is configured to select the first carrier of the flexible cell configuration to transmit the uplink RACH transmission to the base station based on the indicated carrier ID.

In a thirty-fourth aspect, alone or in combination with one or more of the thirtieth aspect through the thirty-third aspect, the configuration of each carrier of the plurality of carriers and the indication of the carrier ID associated with the first carrier of the flexible cell configuration is transmitted in one or more of SI message, or an RRC message.

In a thirty-fifth aspect, alone or in combination with one or more of the thirtieth aspect through the thirty-fourth aspect, the techniques of the thirtieth aspect include transmitting, to the UE, a reference signal.

In a thirty-sixth aspect, alone or in combination with the thirty-fifth aspect, the UE is configured to obtain at least one measurement associated with the reference signal.

In a thirty-seventh aspect, alone or in combination with one or more of the thirty-fifth aspect through the thirty-sixth aspect, the UE is configured to compare the at least one measurement to one or more thresholds.

In a thirty-eighth aspect, alone or in combination with one or more of the thirty-fifth aspect through the thirty-seventh aspect, the UE is configured to select the first carrier of the flexible cell configuration to transmit the uplink RACH transmission to the base station based on the comparing of the at least one measurement to the one or more thresholds.

In a thirty-ninth aspect, alone or in combination with one or more of the thirtieth aspect through the thirty-eighth aspect, the UE is configured to select a supplementary uplink carrier when the at least one measurement does not exceed the one or more thresholds.

In a fortieth aspect, alone or in combination with one or more of the thirtieth aspect through the thirty-ninth aspect, the UE is configured to select a normal uplink carrier when the at least one measurement exceeds the one or more thresholds.

In a forty-first aspect, alone or in combination with one or more of the thirtieth aspect through the fortieth aspect, the at least one measurement includes an RSRP.

In a forty-second aspect, alone or in combination with one or more of the thirtieth aspect through the forty-first aspect, the one or more thresholds includes a single threshold.

In a forty-third aspect, alone or in combination with the forty-second aspect, the single threshold includes one of a legacy threshold configured for legacy supplementary carrier selection, or a new RACH uplink carrier selection threshold.

In a forty-fourth aspect, alone or in combination with one or more of the thirtieth aspect through the forty-third aspect, the one or more thresholds includes a plurality of thresholds.

In a forty-fifth aspect, alone or in combination with the forty-fourth aspect, the UE is configured to determine a subset of carriers of the plurality of carriers based on the comparing.

In a forty-sixth aspect, alone or in combination with one or more of the forty-fourth aspect through the forty-fifth aspect, the UE is configured to select the first carrier of the flexible cell configuration to transmit the uplink RACH transmission to the base station from the subset of carriers.

In a forty-seventh aspect, alone or in combination with one or more of the thirtieth aspect through the forty-sixth aspect, the UE is configured to determine the subset of carriers to include a first subset of the plurality of carriers when the at least one measurement does not exceed a first threshold of the plurality of thresholds.

In a forty-eighth aspect, alone or in combination with the forty-seventh aspect, the UE is configured to determine the subset of carriers to include a second subset of the plurality of carriers when the at least one measurement does not exceed a second threshold of the plurality of thresholds, the second threshold larger than the first threshold, and the second subset of the plurality of carriers different than the first subset of the plurality of carriers.

In a forty-ninth aspect, alone or in combination with one or more of the forty-seventh aspect through the forty-eighth aspect, the UE is configured to determine the subset of carriers to include a third subset of the plurality of carriers when the at least one measurement exceeds the second threshold of the plurality of thresholds, the third subset of the plurality of carriers different than the second subset of the plurality of carriers.

In a fiftieth aspect, alone or in combination with one or more of the thirtieth aspect through the forty-ninth aspect, the UE is configured to select a carrier having a carrier ID with a lowest value in the in the subset of carriers to transmit the uplink RACH transmission to the base station.

In a fifty-first aspect, alone or in combination with the fiftieth aspect, the carrier having the carrier ID with the lowest value is a carrier with the lowest frequency in the subset of carriers.

In a fifty-second aspect, alone or in combination with one or more of the thirtieth aspect through the fifty-first aspect, the techniques of the thirtieth aspect include receiving another uplink RACH transmission over a second carrier of the flexible cell configuration.

In a fifty-third aspect, alone or in combination the fifty-second aspect, the another uplink RACH transmission is a RACH transmission subsequent to the uplink RACH transmission.

In a fifty-fourth aspect, alone or in combination with one or more of the thirtieth aspect through the fifty-third aspect, the second carrier of the flexible cell configuration over which the another uplink RACH transmission is received is the first carrier of the flexible cell configuration over which the uplink RACH transmission is received.

In a fifty-fifth aspect, alone or in combination with one or more of the thirtieth aspect through the fifty-fourth aspect, the second carrier of the flexible cell configuration over which the another uplink RACH transmission is received is indicated in a downlink message transmitted to the UE prior to receiving the another uplink RACH transmission.

In a fifty-sixth aspect, alone or in combination with the fifty-fifth aspect, the downlink message includes one or more of a DCI message, or a Msg2 RAR message.

In a fifty-seventh aspect, alone or in combination with one or more of the thirtieth aspect through the fifty-sixth aspect, the techniques of the thirtieth aspect include indicating, in a repurposed reserved field of a DCI message, a third carrier of the flexible cell configuration configured for the UE to retransmit, from the UE to the base station, the uplink RACH transmission.

In a fifty-eighth aspect, alone or in combination with one or more of the thirtieth aspect through the fifty-seventh aspect, the uplink RACH transmission includes one or more of a PRACH transmission in a 4-step RACH procedure, a Msg3 transmission in a 4-step RACH procedure, a MsgA transmission in a 2-step RACH procedure, or a Msg3 retransmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   selecting a first carrier of a flexible cell configuration to transmit an uplink random access channel (RACH) transmission including a Msg1, the flexible cell configuration including a plurality of carriers including an anchor carrier and at least one non-anchor carrier;
   transmitting the uplink RACH transmission including the Msg1 over the selected first carrier of the flexible cell configuration;
   receiving an indication of a second carrier of the flexible cell configuration to transmit another RACH transmission including a Msg3 in a DCI format 1_0 message;
   selecting the second carrier of the flexible cell configuration to transmit the another uplink RACH transmission including the Msg3;
   transmitting the another uplink RACH transmission including the Msg3 over the selected second carrier of the flexible cell configuration, wherein the Msg1 and the Msg3 are different messages of a 4-step RACH procedure in which the Msg3 is a RACH message of a step of the 4-step RACH procedure subsequent to the Msg1 of a previous step of the 4-step RACH procedure;
   receiving the indication of a third carrier of the flexible cell configuration to retransmit the another uplink RACH transmission including the Msg 3 in a downlink control information (DCI) format 0_0 message;
   selecting the third carrier of the flexible cell configuration to retransmit the another RACH transmission including the Msg3 based on the indication received from a base station in one or more reserved bits of a reserved field of the DCI format 0_0 message, wherein the one or more reserved bits are repurposed to indicate the third carrier to the UE for transmitting the Msg3; and
   retransmitting the another uplink RACH transmission including the Msg3 over the selected third carrier of the flexible cell configuration.

2. The method of claim 1, wherein selecting the first carrier of the flexible cell configuration to transmit the uplink RACH transmission includes:
   receiving, from a base station, a configuration of each carrier of the plurality of carriers of the flexible cell configuration, the configuration including at least a carrier identification (ID) for each carrier of the plurality of carriers of the flexible cell configuration;
   receiving, from the base station, an indication of a carrier ID associated with the first carrier of the flexible cell configuration that the UE is to select to transmit the uplink RACH transmission; and
   selecting the first carrier of the flexible cell configuration to transmit the uplink RACH transmission based on the indicated carrier ID.

3. The method of claim 2, wherein the configuration of each carrier of the plurality of carriers and the indication of the carrier ID associated with the first carrier of the flexible cell configuration is received in one or more of:
   a system information (SI) message; or
   a radio resource control (RRC) message.

4. The method of claim 1, wherein the second carrier of the flexible cell configuration over which the another uplink RACH transmission is transmitted is the first carrier of the flexible cell configuration over which the uplink RACH transmission is transmitted.

5. The method of claim 1, wherein the reserved field of the DCI message is a hybrid automatic repeat request (HARQ) process number field.

6. The method of claim 1, wherein the reserved field of the DCI message is a new data indicator field.

7. The method of claim 1, wherein the first carrier of the flexible cell configuration is selected to transmit the uplink RACH transmission dependent on a RACH transmission type of the uplink RACH transmission.

8. The method of claim 7, wherein the second carrier of the flexible cell configuration is selected to transmit the another uplink RACH transmission dependent on the RACH transmission type of the another uplink RACH transmission.

9. A method of wireless communication performed by a base station, the method comprising:
   receiving, from a user equipment (UE), an uplink random access channel (RACH) transmission including a Msg1 over a first carrier of a flexible cell configuration configured for the UE, wherein the first carrier of the flexible cell configuration is selected by the UE to transmit the uplink RACH transmission to the base station, the flexible cell configuration configured for the UE including a plurality of carriers including an anchor carrier and at least one non-anchor carrier;
   transmitting, to the UE, a downlink RACH transmission including a Msg2 in response to receiving the uplink RACH transmission;
   transmitting an indication of a second carrier of the flexible cell configuration to transmit another RACH transmission including a Msg3 in a DCI format 1_0 message;
   receiving the another uplink RACH transmission including the Msg3 over the second carrier of the flexible cell configuration, wherein the second carrier of the flexible cell configuration is selected by the UE to transmit the another uplink RACH transmission including the Msg3 to the base station, and wherein the Msg1, the Msg2, and the Msg3 are different messages of a 4-step RACH procedure in which the Msg3 is a RACH message of a step of the 4-step RACH procedure subsequent to the Msg1 of a previous step of the 4-step RACH procedure;

transmitting, to the UE, an indication of a third carrier for retransmission of the another uplink RACH transmission including the Msg3 in one or more reserved bits of a reserved field of a downlink control information (DCI) format 0_0 message, wherein the one or more reserved bits are repurposed to indicate the third carrier to the UE for transmitting the Msg3; and receiving a retransmission of the another uplink RACH transmission including the Msg3 over the third carrier of the flexible cell configuration.

10. The method of claim 9, further comprising:

transmitting, to the UE, a configuration of each carrier of the plurality of carriers of the flexible cell configuration configured for the UE, the configuration including at least a carrier identification (ID) for each carrier of the plurality of carriers of the flexible cell configuration; and transmitting, to the UE, an indication of a carrier ID associated with the first carrier of the flexible cell configuration that the UE is to select to transmit the uplink RACH transmission, wherein the UE is configured to select the first carrier of the flexible cell configuration to transmit the uplink RACH transmission to the base station based on the indicated carrier ID.

11. The method of claim 10, wherein the configuration of each carrier of the plurality of carriers and the indication of the carrier ID associated with the first carrier of the flexible cell configuration is transmitted in one or more of:

a system information (SI) message; or a radio resource control (RRC) message.

12. The method of claim 9, wherein the second carrier of the flexible cell configuration over which the another uplink RACH transmission is received is the first carrier of the flexible cell configuration over which the uplink RACH transmission is received.

13. The method of claim 9, wherein the reserved field of the DCI message is a hybrid automatic repeat request (HARQ) process number field.

14. The method of claim 9, wherein the reserved field of the DCI message is a new data indicator field.

15. The method of claim 9, wherein the first carrier of the flexible cell configuration selected to transmit the uplink RACH transmission is dependent on a RACH transmission type of the uplink RACH transmission.

16. The method of claim 15, wherein the second carrier of the flexible cell configuration selected to transmit the another uplink RACH transmission is dependent on the RACH transmission type of the another uplink RACH transmission.

17. A method of wireless communication performed by a user equipment (UE), the method comprising:

comparing at least one measurement associated with a reference signal from a base station to a plurality of thresholds; and selecting a first carrier of a flexible cell configuration to transmit an uplink random access channel (RACH) transmission based on the comparing of the at least one measurement to the plurality of thresholds, the flexible cell configuration including a plurality of carriers including an anchor carrier and at least one non-anchor carrier, wherein selecting the first carrier of the flexible cell configuration to transmit the uplink RACH transmission based on the comparing of the at least one measurement to the plurality of thresholds includes:

determining a subset of carriers of the plurality of carriers based on the comparing to include a first subset of the plurality of carriers when the at least one measurement does not exceed a first threshold of the plurality of thresholds, to include a second subset of the plurality of carriers when the at least one measurement does not exceed a second threshold of the plurality of thresholds, and to include a third subset of the plurality of carriers when the at least one measurement exceeds the second threshold of the plurality of thresholds, wherein the second threshold is larger than the first threshold, the second subset of the plurality of carriers is different than the first subset of the plurality of carriers, and the third subset of the plurality of carriers is different than the second subset of the plurality of carriers; and selecting the first carrier of the flexible cell configuration to transmit the uplink RACH transmission from the subset of carriers, wherein the first subset of the plurality of carriers, the second subset of the plurality of carriers, or the third subset of the plurality of carriers included in the subset of carriers from within which the first carrier is selected is determined based on where the at least one measurement is within a range formed by the plurality of thresholds, wherein selecting the first carrier of the flexible cell configuration to transmit the uplink RACH transmission based on the comparing of the at least one measurement to the plurality of thresholds includes:

selecting a supplementary uplink carrier when the at least one measurement does not exceed a threshold of the plurality of thresholds; and selecting a normal uplink carrier when the at least one measurement exceeds the threshold of the plurality of thresholds; and transmitting the uplink RACH transmission over the selected first carrier of the flexible cell configuration.

18. The method of claim 17, wherein the at least one measurement includes a reference signal receive power (RSRP).

19. The method of claim 17, wherein the plurality of thresholds includes a legacy threshold configured for legacy supplementary carrier selection.

20. The method of claim 17, wherein selecting the first carrier of the flexible cell configuration to transmit the uplink RACH transmission from the subset of carriers includes:

selecting a carrier having a carrier identification (ID) with a lowest value.

21. A method of wireless communication performed by a base station, the method comprising:

transmitting, to a user equipment (UE), a reference signal, wherein the UE is configured to obtain at least one measurement associated with the reference signal, compare the at least one measurement to a plurality of thresholds, and select a first carrier of a flexible cell configuration to transmit an uplink random access channel (RACH) transmission to the base station based on comparing of the at least one measurement to the plurality of thresholds, the flexible cell configuration configured for the UE including a plurality of carriers including an anchor carrier and at least one non-anchor carrier, and wherein the UE is configured to determine a subset of carriers of the plurality of carriers to include a first subset of the plurality of carriers when the at least one measurement does not exceed a first threshold of the plurality of thresholds, to include a second subset of the plurality of carriers when the at least one measurement does not exceed a second threshold of the plurality of thresholds, and to include a third subset of the plurality of carriers when the at least one measurement exceeds the second threshold of the plurality of thresholds based on the comparing, wherein the second threshold is larger than the first threshold, the second subset of the plurality of carriers is different than the first subset of the plurality of carriers, and the third subset of the plurality of carriers is different than the second subset of the plurality of carriers, and the UE is configured to select the first carrier of the flexible cell configuration to transmit the uplink RACH transmission to the base station from the subset of carriers, wherein the first subset of the plurality of carriers, the second subset of the plurality of carriers, or the third subset of the plurality of carriers included in the subset of carriers from within which the first carrier is selected is determined based on where the at least one measurement is within a range formed by the plurality of thresholds, and wherein the UE is configured to select a supplementary uplink carrier when the at least one measurement does not exceed a threshold of the plurality of thresholds, and to select a normal uplink carrier when the at least one measurement exceeds the threshold of the plurality of thresholds;

receiving, from the UE, the uplink RACH transmission over the first carrier of the flexible cell configuration configured for the UE, wherein the first carrier of the flexible cell configuration is selected by the UE to transmit the uplink RACH transmission to the base station; and transmitting, to the UE, a downlink RACH transmission in response to receiving the uplink RACH transmission.

22. The method of claim 21, wherein the at least one measurement includes a reference signal receive power (RSRP).

23. The method of claim 21, wherein the plurality of thresholds includes a legacy threshold configured for legacy supplementary carrier selection.

24. The method of claim 21, wherein the UE is configured to select a carrier having a carrier identification (ID) with a lowest value in the subset of carriers to transmit the uplink RACH transmission to the base station, wherein the carrier having the carrier ID with the lowest value is a carrier with a lowest frequency in the subset of carriers.

* * * * *